(12) United States Patent
Inselberg

(10) Patent No.: US 8,131,279 B2
(45) Date of Patent: *Mar. 6, 2012

(54) METHOD AND APPARATUS FOR INTERACTIVE AUDIENCE PARTICIPATION AT A LIVE ENTERTAINMENT EVENT

(75) Inventor: Eric Inselberg, Short Hills, NJ (US)

(73) Assignee: Inselberg Interactive, LLC, Short Hills, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/927,580

(22) Filed: Nov. 18, 2010

(65) Prior Publication Data

US 2011/0189942 A1    Aug. 4, 2011

Related U.S. Application Data

(63) Continuation of application No. 11/894,163, filed on Aug. 20, 2007, now Pat. No. 7,860,523, which is a continuation of application No. 11/542,819, filed on Oct. 4, 2006, now Pat. No. 7,522,930, which is a continuation of application No. 11/266,783, filed on Nov. 4, 2005, now Pat. No. 7,123,930, which is a continuation of application No. 10/661,871, filed on Sep. 12, 2003, now Pat. No. 6,975,878, which is a continuation of application No. 09/854,267, filed on May 11, 2001, now Pat. No. 6,650,903, which is a continuation of application No. 09/656,096, filed on Sep. 6, 2000, now Pat. No. 6,434,398.

(51) Int. Cl.
*H04M 3/42* (2006.01)
(52) U.S. Cl. .......... 455/417; 455/575.6; 463/36
(58) Field of Classification Search ........... 455/414.2, 455/414.1, 466, 3.01–3.06, 517, 575.6; 463/36–42; 434/350, 362, 323, 322; 273/460; 705/10, 705/14, 27, 29; 725/24, 32, 74, 86
See application file for complete search history.

(56) References Cited

U.S. PATENT DOCUMENTS

| | | | |
|---|---|---|---|
| 4,141,548 A | 2/1979 | Everton | 273/1 E |
| 4,496,148 A | 1/1985 | Morstain et al. | 273/1 E |
| 4,722,526 A | 2/1988 | Tovar et al. | 273/1 E |
| 5,213,337 A | 5/1993 | Sherman | 273/439 |
| 5,226,177 A | 7/1993 | Nickerson | 455/2 |
| 5,273,437 A | 12/1993 | Caldwell et al. | 434/351 |
| 5,526,035 A | 6/1996 | Lappington et al. | 348/13 |
| RE35,449 E | 2/1997 | Derks | 395/800 |

(Continued)

OTHER PUBLICATIONS

Claims chart, Created by Van Dyke. Gardner, Linn & Burkart LLP, 2851 Charlevoix Drive S. E., Grand Rapids, Michigan 49588-8695 www.vglb.com.

(Continued)

*Primary Examiner* — Jean Gelin
(74) *Attorney, Agent, or Firm* — Ernest D. Buff; Ernest D. Buff & Associates LLC

(57) ABSTRACT

The present invention relates to methods and systems for providing interactive audience participation at live entertainment events. The method includes providing audience members with an interactive device that presents a promotional message and includes a user interface, broadcasting audio programming to the audience member through the interactive device, querying the audience members, wherein answers to the querying may be entered by the audience member via the user interface of the interactive device, transmitting the answers to a central processor, storing the answers as audience data, processing the audience data into results, storing the results of the processing of the audience data and broadcasting the results of the processing of the audience data.

20 Claims, 2 Drawing Sheets

U.S. PATENT DOCUMENTS

| | | | | |
|---|---|---|---|---|
| 5,724,357 | A | 3/1998 | Derks | 370/413 |
| 5,801,754 | A | 9/1998 | Rybal et al. | 348/13 |
| 5,860,862 | A | 1/1999 | Junkin | 463/40 |
| 5,916,024 | A | 6/1999 | Von Kohorn | 463/40 |
| 5,946,635 | A | 8/1999 | Dominguez | 455/558 |
| 5,993,314 | A | 11/1999 | Dannenberg et al. | 463/1 |
| 6,021,119 | A | 2/2000 | Derks et al. | 370/261 |
| 6,080,063 | A | 6/2000 | Khosta | 463/42 |
| 6,193,610 | B1 | 2/2001 | Junkin | 463/40 |
| 6,293,868 | B1 | 9/2001 | Bernard | 463/42 |
| 6,434,398 | B1 | 8/2002 | Inselberg | 455/517 |
| 6,840,861 | B2 | 1/2005 | Jordan et al. | 463/42 |
| 7,650,623 | B2 | 1/2010 | Hudgeons et al. | 725/136 |
| 2002/0029381 | A1 | 3/2002 | Inselberg | 725/9 |
| 2002/0115454 | A1 | 8/2002 | Hardacker | 455/457 |
| 2002/0119823 | A1 | 8/2002 | Beuscher | 463/42 |
| 2002/0199198 | A1 | 12/2002 | Stonedahl | 725/86 |

OTHER PUBLICATIONS http://en.wikipedia.org/wiki/Jumbotron ; definiton on wikipedia website for Sony's Jumbtron.
http://www.meridia-interactive.com: Meridia Audience Response Systems.
http://www.replysystems.com: Wireless Audience Response and Voting Systems.
http://www.presentationtesting.com: Presentation Testing, Inc.

METHOD AND APPARATUS FOR INTERACTIVE AUDIENCE PARTICIPATION AT A LIVE ENTERTAINMENT EVENT

RELATED U.S. APPLICATION DATA

This application is a continuation of applicant's U.S. patent application Ser. No. 11/894,163, filed Aug. 20, 2007 now U.S. Pat. No. 7,860,523 which, in turn, is a continuation of applicant's U.S. patent application Ser. No. 11/542,819, filed Oct. 4, 2006, now U.S. Pat. No. 7,522,930 which, in turn, is a continuation of applicant's U.S. patent application Ser. No. 11/266,783, filed Nov. 4, 2005, now U.S. Pat. No. 7,123,930 which, in turn, is a continuation of applicant's U.S. patent application Ser. No. 10/661,871, filed Sep. 12, 2003, now U.S. Pat. No. 6,975,878 which, in turn, is a continuation of applicant's U.S. patent application Ser. No. 09/854,267, filed May 11, 2001, now U.S. Pat. No. 6,650,903 which, in turn, is a continuation of applicant's U.S. patent application Ser. No. 09/656,096, filed Sep. 6, 2000, now U.S. Pat. No. 6,434,398.

BACKGROUND OF THE INVENTION

1. Field of the Invention

The present invention relates to a method for interactive audience participation at a live entertainment event. The invention also relates to a system that is used in connection with such method.

2. Description of the Prior Art

Spectator events and, in particular, spectator sporting events have become a multibillion dollar a year business throughout the world. Millions of people attend their favorite sporting events, choosing among baseball, soccer, basketball, hockey, football, tennis, golf, auto racing, horse racing, boxing, and many others. Rather than merely watching sporting events on television, fans are willing to pay for the privilege of attending such events live in order to enjoy the spontaneity and excitement.

Audience reaction at live spectator events is generally gauged informally on crowd volume. At certain events, limited amounts of information are shared with audience members using large screen displays such as those available from Sony Corporation under the trademark JUMBOTRON™. However, the opportunities for audience participation and useful or meaningful audience feedback are limited.

Marketing research has shown that audience members desire both an opportunity to participate in the spectator event and enjoy interactivity with other audience members. Informed audience members desire an opportunity to share their opinions with others. Heretofore, there has been no practical means to solicit the aggregate positions and the opinions of audience members at large venues (e.g., stadiums, arenas, race tracks, golf courses, theme parks, and other expansive outdoor/indoor venues).

Fans at live spectator events have come to expect background information and detailed analysis from viewing televised sporting events at home and/or readily obtaining such information over the Internet. Further, audience members are becoming more and more accustomed to interactivity from their use of computer games, such as fantasy sports league games, that allow them to organize teams, determine game strategies and test their skill at managing a sports team. Accordingly, in order to continue attracting live audiences to attend these large venues, promoters have an incentive to provide audience members with an enhanced experience.

One example of a venue that would benefit from enhanced audience participation is major league baseball. The games last several hours, and audience members spend most of their time in and around a reserved seat. When going to the concession stand or restrooms, the fan misses part of the game. Further, opportunities for interaction and expressing one's opinion are typically limited to cheering or jeering. Occasionally, a single fan or a few fans are selected to participate in a contest, such as a trivia contest, but these opportunities are extremely limited. Nearly every fan has an opinion about how the game should be played, and would like an opportunity to express his or her opinion. Ideally, fans would like to be recognized for their skill and knowledge concerning individual teams and/or winning strategies. Fans also desire to express opinions concerning facilities, sponsors, players, management and concessions. Being able to voice an opinion, and comparing the opinion to that of other fans, would enhance the overall experience. Also, this kind of information can be useful to management by helping it determine the kind of services that fans desire.

Additionally, an often-heard complaint from fans is that they missed some of the action because they could not see or did not know precisely what was happening. For example, sometimes the seat location of the attendee fails to offer an unobstructed view. On other occasions a technical ruling may be made by a game official that is not fully explained to those in attendance but is fully analyzed by television and/or radio announcers.

It is also noted that spectators commuting to and/or from events do not have ready access to desirable information such as sports related information and other information such as traffic and weather reports.

SUMMARY OF THE INVENTION

The present invention relates to a method and apparatus for enhancing the experience of audience members at live spectator events by more fully involving the audience. In a preferred embodiment of the invention, the method of enhancing audience participation comprises communicating information to fans at a sporting event using an interactive device that allows fans to respond to displayed messages. Individual fan feedback is stored, processed (e.g., tabulated) and displayed back to the individual fan or the audience as a whole. The interactive device is preferably a wireless, hand held device, which includes an audio component to allow the user to listen to play-by-play and expert commentary during the live event. The audio component may also provide spectators with other desirable information such as traffic and weather reports. Since the device is easily transported, the fan can carry it on trips to the concession stands or to the restrooms. Further, the method presents promotional messages of sponsors and advertisers to each user of the interactive device. The promotional message may be permanently affixed to the device and/or transmitted to each device via open band lines. In a more specific method, the location of individual fans is identified by means of a transceiver located within the interactive device.

The method can be used to conduct contests wherein a fan is asked to predict the next event or events to take place (e.g. the outcome of the next at bat in a baseball game or the next play or plays to be called in a football game on a real time basis, all star balloting, pitching changes, etc.). Using simple input devices, such as arrow keys and an enter key, a touch screen display or a numeric keypad, the fan selects from a list of promptings and/or possible answers. A fan that correctly predicts a predetermined number of outcomes may be awarded an electronic coupon that can be redeemed for concessions and/or other prizes. Alternatively, the prize could be delivered to the fan based on the location of the fan's interactive device by means of communication with the transceiver located therein.

One advantage of the invention is that promotional messages and advertisements receive a higher degree of attention from fans, because the fans are more interested in the interactive content than in passively viewing or listening to broadcast messages.

Another advantage of the invention is that it is possible to receive instantaneous and correlated feedback from a large number of fans, which is valuable information for, by way of example, sponsors, teams and leagues.

A further advantage of the invention is that fans value the expert commentary, freedom of movement and the interactivity afforded by the method, increasing their enjoyment and the perceived value of attending a live sporting event.

Other objects, features and advantages of the invention will be readily apparent from the following detailed description of a preferred embodiment thereof taken in conjunction with the drawings.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

For the purpose of illustrating the invention, there is shown in the accompanying drawings a form which is presently preferred; it being understood that the invention is not intended to be limited to the precise arrangements and instrumentalities shown.

DETAILED DESCRIPTION OF THE INVENTION

Figure 1:
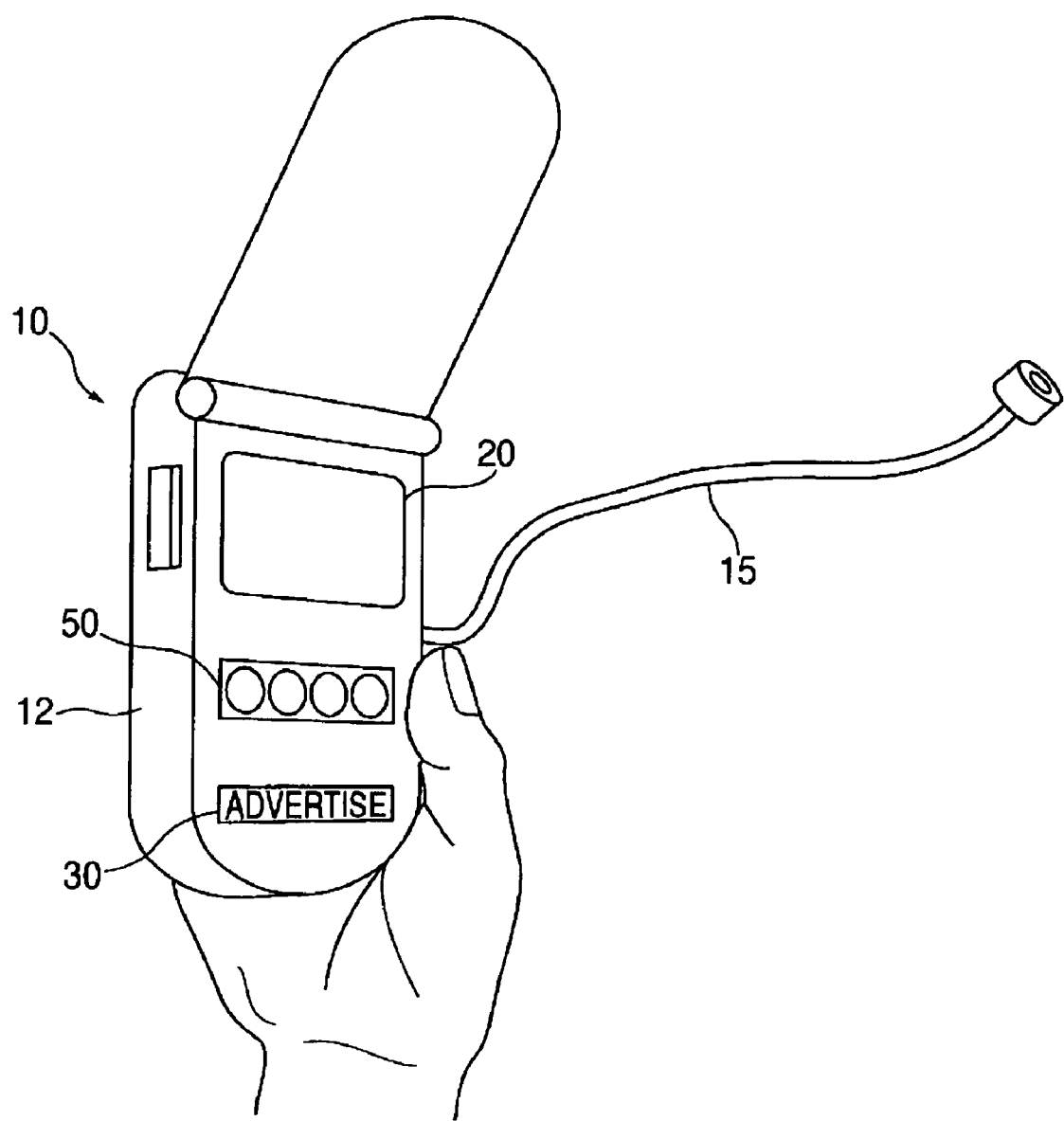
FIG. 1 is a perspective view of hand held device used in connection with the interactive audience participation system of the present invention.

Referring now to the drawings in detail wherein like reference numerals have been used throughout the various figures to designate like elements, there is shown in FIG. 1 a hand held, interactive device 10 adapted for use in connection with the interactive audience participation system of the present invention.

Figure 2:
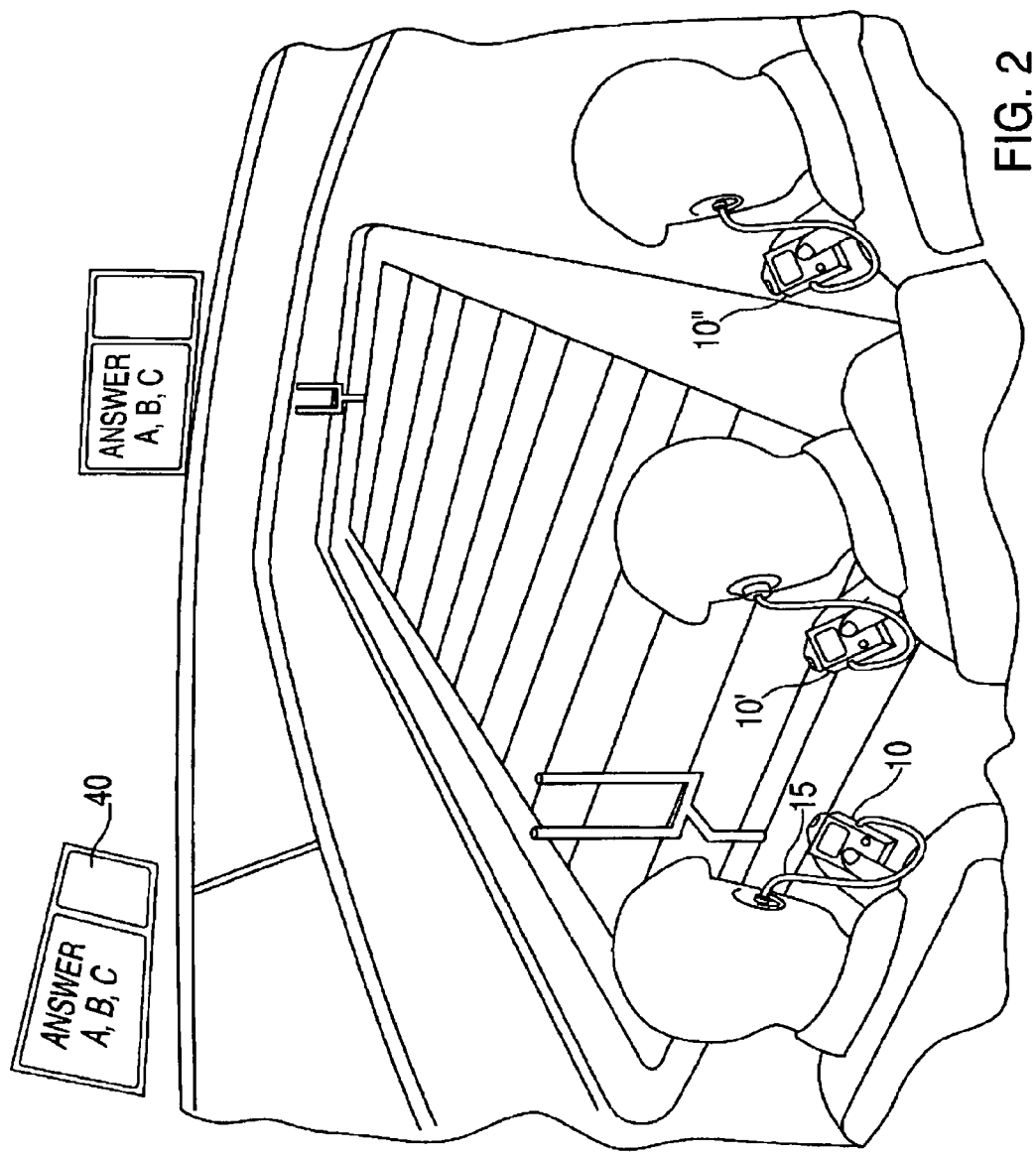
FIG. 2 is a schematic diagram of audience members at a spectator event utilizing the interactive audience participation system of the present invention.

The device is preferably provided to audience members at a live spectator event as shown in FIG. 2. The device is adapted to provide information to the user. In a preferred embodiment the device 10 includes a housing 12 with an electronic display opening. The device 10 preferably includes a multiband radio incorporated therein with an audio receiving circuit and an audio output means (not shown). The audio output means is in electrical communication with the audio receiving circuit in a manner known in the art. The radio is adapted to receive AM, FM and/or VHF signals from a number of predetermined frequencies.

An earpiece 15 is included to allow the user to listen to the radio associated with the device without annoying neighboring fans. It is noted that other listening means could be employed such as earphones and the like.

An electronic display (visual display) 20 is preferably mounted within the housing and is visible through the electronic display opening therein. The electronic display is in electrical communication with a local microprocessor mounted within the housing. A transceiver in electrical communication with the local microprocessor allows for the transmission and receipt of data from a central processor (not shown) in a manner known in the art. The electronic display is adapted to display data received from the local microprocessor. For example, the visual display is adapted to display messages that ask the audience member to answer a question or provide an opinion. It is contemplated that data in the form of audio messages could be sent to the user in lieu of or in addition to the visual display.

The device 10 preferably presents promotional messages from sponsors and/or advertisers, essentially underwriting the cost of a user interface device. Such messages can be in the form of indicia 30 located (e.g., physically imprinted) on the device. Additionally, the messages can be visually displayed on the visual display 20 of the device or can be aurally communicated through the same. The messages can be in the form of pre-programmed visual messages or recordings or can be transmitted live during the spectator event via open band lines. The device is preferably provided to each audience member as part of the price of admission or, alternatively, as an optional item purchased by the audience member, and subsidized by the promotional messages.

In one embodiment, a large screen display 30, as depicted in FIG. 2, remotely located from the fan (e.g., a JUMBOTRON™ display) is used for querying users of the interactive device. A user interface 50 on the device 10 allows an audience member to enter a response to queries. Examples of simple user interfaces are a keypad, selection buttons, touch screen, rotatable dial or voice recognition, but any other user interface could be incorporated within the invention. In an alternate embodiment, the user interface device is adapted to interact with other fans by allowing for the broadcasting of messages to all audience members or, alternatively, from one individual audience member to another. Many easy to use interfaces are known to one of ordinary skill in the art, and the invention is not limited to any particular user interface.

The responses of the audience members are sent to a central processor (not shown) that is adapted to tabulate the responses. Then, the processed information is stored and displayed to the audience member, either on the device 10 or a large screen display 40 remotely located from the fan. FIGS. 1 and 2. The processed information could be a compilation of the number of similar responses or as a percentage of total responses or graphically in a bar chart, pie chart or some other graphical, numerical or combined graphical and numerical representation of the data.

One representative embodiment of the present invention is a method of enhancing the enjoyment of spectators at live entertainment venues.

In the first step of the method, spectators are provided with an interactive device 10, 10' and 10". FIG. 2. The interactive device may be any device which permits broadcast of audio or video or both audio and video and provides the spectator with a user interface for sending replies to queries. The interactive device is adapted to present promotional messages either by placing the same on the device or by visually or aurally transmitting messages through the same.

Optionally, the device could be used to send messages to another fan, group of fans or all fans. This feature could be enabled in a manner similar to email by having a unique address programmed in each device. Optionally, the users could be queried to input a section and seat number. Inputting a seat number has the additional benefit of allowing delivery of awards, incentives and prizes directly to the spectator's seat. Another way to deliver prizes to spectators would be completely electronic. An award could be sent electronically to the unique address programmed in the interactive device, which could then be redeemed at either a central location or at one of the concession stands. This could be done without entering a seat number.

Another step involves broadcasting audible programming to spectators, using the interactive device. This is accomplished by incorporating an audio receiving circuit within the device which is adapted to receive RF and/or VHF signals at predetermined frequencies.

Querying of spectators, wherein answers may be entered by spectators using their interactive devices, is yet another step of the method.

Transmitting the answers from the spectators to a receiver or receivers is the next step in the method followed by receiving the answers, either at a central processing station or at distributed processing stations.

Storing the answers, at least temporarily, as spectator data, and processing the spectator data are additional steps in the method. This is followed by storing the results of the processing of the spectator data, at least temporarily.

Displaying the results of the processing of the spectator data is a step that generally follows the processing of the spectator data. This provides feedback to the spectators, showing them how their answers compared to other spectators. The steps of querying, transmitting, receiving, storing and displaying may all be accomplished via technology known in the art. Additionally, the steps of querying and transmitting are preferably achieved using wireless communications known in the art. The wireless communications are preferably selected from the group consisting of radio transmissions, microwave transmissions, broadband wireless data transmissions, and satellite transmissions.

The offering of prizes to a selected spectator or spectators who have responded to the querying, participated in the interactive games or answered correctly quiz questions may be utilized to enhance the enjoyment of spectators.

Another optional embodiment of the method allows for wireless transmitting of the answers and/or responses to the querying.

Ultra-wide band transmission is a promising technology for the broadcasting of messages and transmission of spectators' responses. It has the advantage of multiplexing over a single frequency.

It is contemplated that the step of displaying the results may be achieved by using a stadium large screen display. Alternatively, the step of displaying the results may be achieved using a stadium monitor system or using a display incorporated in the interactive device or such information may be broadcast as audibly or both audibly and visibly.

The present invention may be embodied in other forms without departing from the spirit or essential attributes thereof and accordingly reference should be made to the claims rather than to the foregoing specification as indicating the scope thereof.

What is claimed is:

1. A system for enabling interactive participation by audience members attending a live entertainment event at an expansive outdoor/indoor venue and employing a wireless interactive device having capability (i) to receive and transmit messages, (ii) accept input via a user interface, and (iii) display messages on an electronic display, the system comprising:
a wireless communication system configured to transmit and receive messages with the interactive device;
a means for presenting the audience members with an opportunity to respond to at least one request for interaction with responses entered through the user interface and transmitted by the interactive device;
a means for receiving the responses at a central processing station or distributed processing stations;
a means for storing the received responses as audience data;
a central processor configured to receive and process the audience data into results; and
wherein the expansive outdoor/indoor venue is selected from the group consisting of stadiums, arenas, race tracks, golf courses, and theme parks.

2. The system of claim 1, wherein the expansive outdoor/indoor venue is a venue where a purchase can be made.

3. The system of claim 1, further comprising means for disseminating least one promotional message of a sponsor to the audience members through the electronic display.

4. The system of claim 3, further comprising means for providing the results to the sponsor.

5. The system of claim 1, wherein the presenting means comprises a device other than the interactive device and which is perceptible to audience members in the expansive outdoor/indoor venue.

6. The system of claim 1, wherein the presenting means comprises a stadium monitor system visible to audience members in the expansive outdoor/indoor venue.

7. The system of claim 1, further comprising means for providing audio transmission of audible programming to the interactive devices.

8. A method for enabling interactive audience participation at a live entertainment event at an expansive outdoor/indoor venue attended by a plurality of participating audience members employing a hand-held, wireless interactive device that includes a user interface, the method comprising the steps of:
presenting an opportunity for interaction to the participating audience members;
receiving responses to the opportunity for interaction entered by the participating audience members via the user interface of the interactive device;
transmitting the responses to a central processor;
processing the responses into results; and
broadcasting the results to the plurality of participating audience members attending the live entertainment event; and
wherein the expansive outdoor/indoor venue is selected from the group consisting of stadiums, arenas, race tracks, golf courses, and theme parks.

9. The method of claim 8, wherein the expansive outdoor/indoor venue is a venue where a purchase can be made.

10. The method of claim 8, further comprising the step of presenting a promotional message to each participating audience member.

11. The method of claim 10, wherein the promotional message is transmitted wirelessly to the interactive device and is presented to the participating audience member either visually or aurally.

12. The method of claim 8, further comprising the step of awarding a prize to at least one selected audience member who has responded.

13. The method of claim 8, wherein the wireless device employs a form of wireless communications selected from the group consisting of radio transmissions, microwave transmissions, broadband wireless data transmissions, and satellite transmissions.

14. The method of claim 8, wherein the answers are received at distributed processing stations and thereafter transmitted to the central processor.

15. A method for interactive audience participation at a live entertainment event at an expansive outdoor/indoor venue attended by audience members, a plurality of whom have a wireless interactive device including a user interface, the method comprising the steps of:

presenting at least one promotional message from a sponsor;

presenting an opportunity for interaction to the audience members;

receiving responses to the opportunity for interaction entered via the user interface of the interactive device;

transmitting the responses to a processor;

processing the responses into results; and providing the results to the sponsor;

wherein the expansive outdoor/indoor venue is selected from the group consisting of stadiums, arenas, race tracks, golf courses, and theme parks.

16. The method of claim 15, wherein the expansive outdoor/indoor venue is a location where a purchase can be made.

17. The method of claim 15, further comprising the step of broadcasting the results to the audience members attending the live entertainment event.

18. The method of claim 15, further comprising the step of electronically delivering a prize to at least one selected audience member who has responded to the opportunity for interaction.

19. The method of claim 15, wherein the step of presenting an opportunity for interaction comprises use of a large screen display.

20. The method of claim 15, wherein the step of presenting an opportunity for interaction comprises use of a device other than the interactive device.

\* \* \* \* \*